(12) United States Patent
Kolar et al.

(10) Patent No.: US 11,049,033 B2
(45) Date of Patent: Jun. 29, 2021

(54) DERIVING HIGHLY INTERPRETABLE COGNITIVE PATTERNS FOR NETWORK ASSURANCE

(71) Applicant: Cisco Technology, Inc., San Jose, CA (US)

(72) Inventors: Vinay Kumar Kolar, San Jose, CA (US); Vikram Kumaran, Cary, NC (US); Abhishek Kumar, Vancouver (CA); Santosh Ghanshyam Pandey, Fremont, CA (US); Jean-Philippe Vasseur, Saint Martin d'uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 148 days.

(21) Appl. No.: 15/869,639

(22) Filed: Jan. 12, 2018

(65) Prior Publication Data
US 2019/0220760 A1     Jul. 18, 2019

(51) Int. Cl.
| | |
|---|---|
| *G06N 7/00* | (2006.01) |
| *H04L 12/24* | (2006.01) |
| *G06N 20/00* | (2019.01) |
| *H04L 12/26* | (2006.01) |

(52) U.S. Cl.
CPC ............. *G06N 7/005* (2013.01); *G06N 20/00* (2019.01); *H04L 41/0659* (2013.01); *H04L 41/142* (2013.01); *H04L 41/5067* (2013.01); *H04L 41/16* (2013.01); *H04L 43/0823* (2013.01); *H04L 43/0888* (2013.01); *H04L 43/16* (2013.01)

(58) Field of Classification Search
CPC .... G06N 7/005; G06N 20/00; H04L 41/0659; H04L 41/5067
USPC .......................................................... 709/224
See application file for complete search history.

(56) References Cited

U.S. PATENT DOCUMENTS

| | | | | |
|---|---|---|---|---|
| 9,159,035 | B1 * | 10/2015 | Ismael | ................ G06F 9/45558 |
| 9,773,112 | B1 * | 9/2017 | Rathor | ................ G06F 21/554 |
| 2011/0119375 | A1 | 5/2011 | Beeco et al. | |

(Continued)

OTHER PUBLICATIONS

Gonzalez, et al., "Root Cause Analysis of Network Failures Using Machine Learning and Summarization Techniques", Network Testing and Analytics, IEEE Communications Magazine—Sep. 2017, vol. 55, Issue: 9, 6 pages, IEEE.

*Primary Examiner* — Joseph L Greene
(74) *Attorney, Agent, or Firm* — Behmke Innovation Group LLC; Kenneth J. Heywood; Jonathon P. Western

(57) ABSTRACT

In one embodiment, a network assurance system that monitors a network labels time periods with positive labels, based on the network assurance system detecting problems in the network during the time periods. The network assurance system assigns tags to discrete portions of a feature space of measurements from the monitored network, based on whether a particular range of values in the feature space has a threshold probability of occurring during a positively-labeled time period. The network assurance system determines a set of the assigned tags that frequently co-occur with the positively-labeled time periods in which problems are detected in the network. The network assurance system causes performance of a mitigation action in the network based on the set of assigned tags that frequently co-occur with the positively-labeled time periods.

14 Claims, 10 Drawing Sheets

(56) References Cited

U.S. PATENT DOCUMENTS

| | | | |
|---|---|---|---|
| 2012/0209879 A1* | 8/2012 | Banerjee | G06F 16/338 |
| | | | 707/776 |
| 2015/0135012 A1 | 5/2015 | Bhalla et al. | |
| 2015/0229661 A1 | 8/2015 | Balabine et al. | |
| 2016/0337175 A1* | 11/2016 | Rao | H04L 49/25 |
| 2016/0350194 A1 | 12/2016 | Mohan et al. | |
| 2017/0019291 A1 | 1/2017 | Tapia et al. | |
| 2017/0024662 A1 | 1/2017 | Warn et al. | |
| 2017/0063905 A1* | 3/2017 | Muddu | G06F 16/254 |
| 2018/0285776 A1* | 10/2018 | Miskovic | G06N 5/047 |
| 2018/0295588 A1* | 10/2018 | Abdelmonem | H04B 1/1036 |
| 2019/0034635 A1* | 1/2019 | Khatri | G06F 21/57 |

\* cited by examiner

DERIVING HIGHLY INTERPRETABLE COGNITIVE PATTERNS FOR NETWORK ASSURANCE

TECHNICAL FIELD

The present disclosure relates generally to computer networks, and, more particularly, to deriving highly interpretable cognitive patterns for network assurance.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following is description in conjunction with the accompanying drawings in which like reference numerals indicate identically or functionally similar elements, of which.

DESCRIPTION OF EXAMPLE EMBODIMENTS

Overview

Figure 1A:
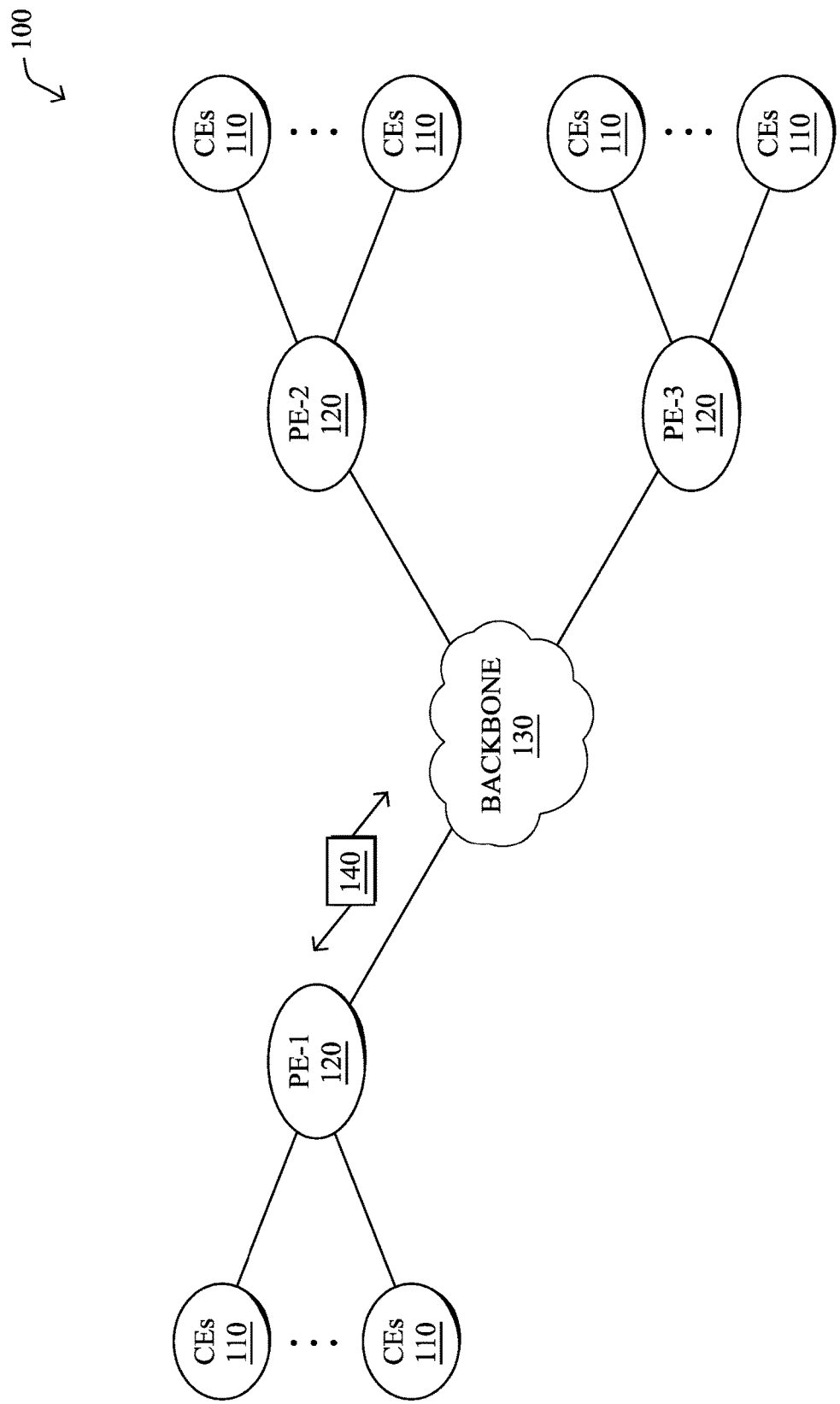
FIGS. 1A-1B illustrate an example communication network.

According to one or more embodiments of the disclosure, a network assurance system that monitors a network labels time periods with positive labels, based on the network assurance system detecting problems in the network during the time periods. The network assurance system assigns tags to discrete portions of a feature space of measurements from the monitored network, based on whether a particular range of values is in the feature space has a threshold probability of occurring during a positively-labeled time period. The network assurance system determines a set of the assigned tags that frequently co-occur with the positively-labeled time periods in which problems are detected in the network. The network assurance system causes performance of a mitigation action in the network based on the set of assigned tags that frequently co-occur with the positively-labeled time periods.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
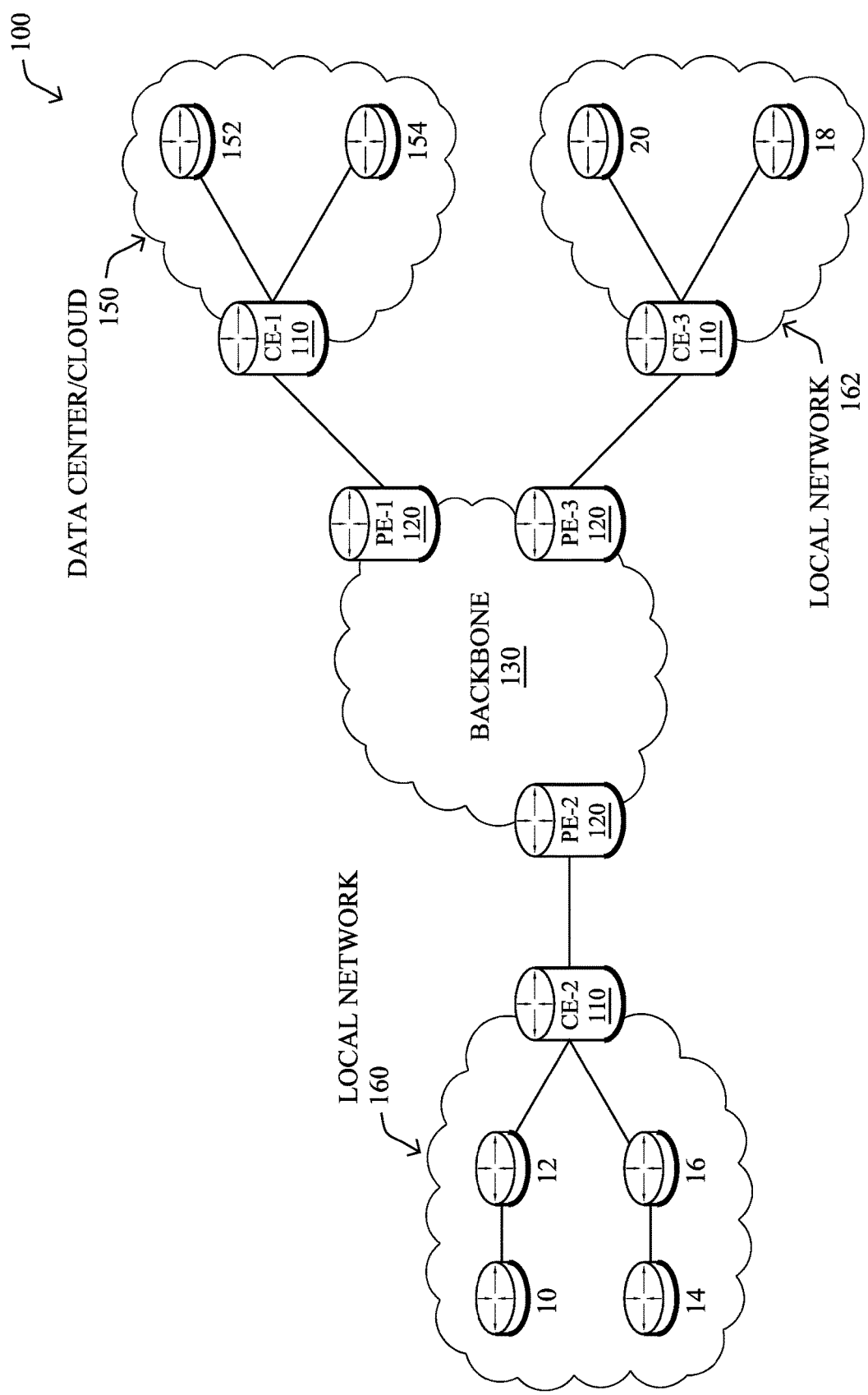

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a is network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal is changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
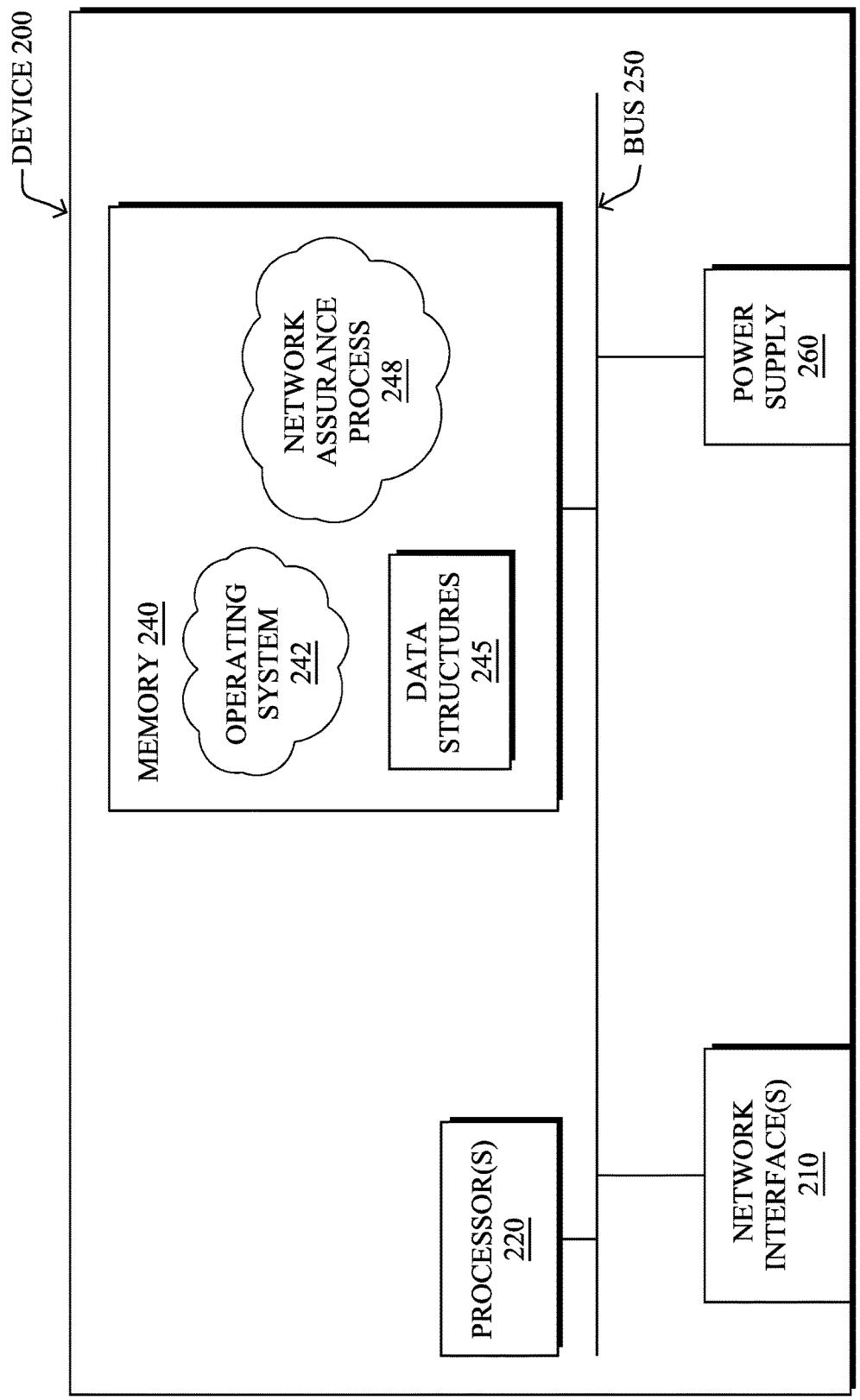
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers

120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), is portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak is from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, is supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true is positives the sum of true and false positives.

Figure 3:
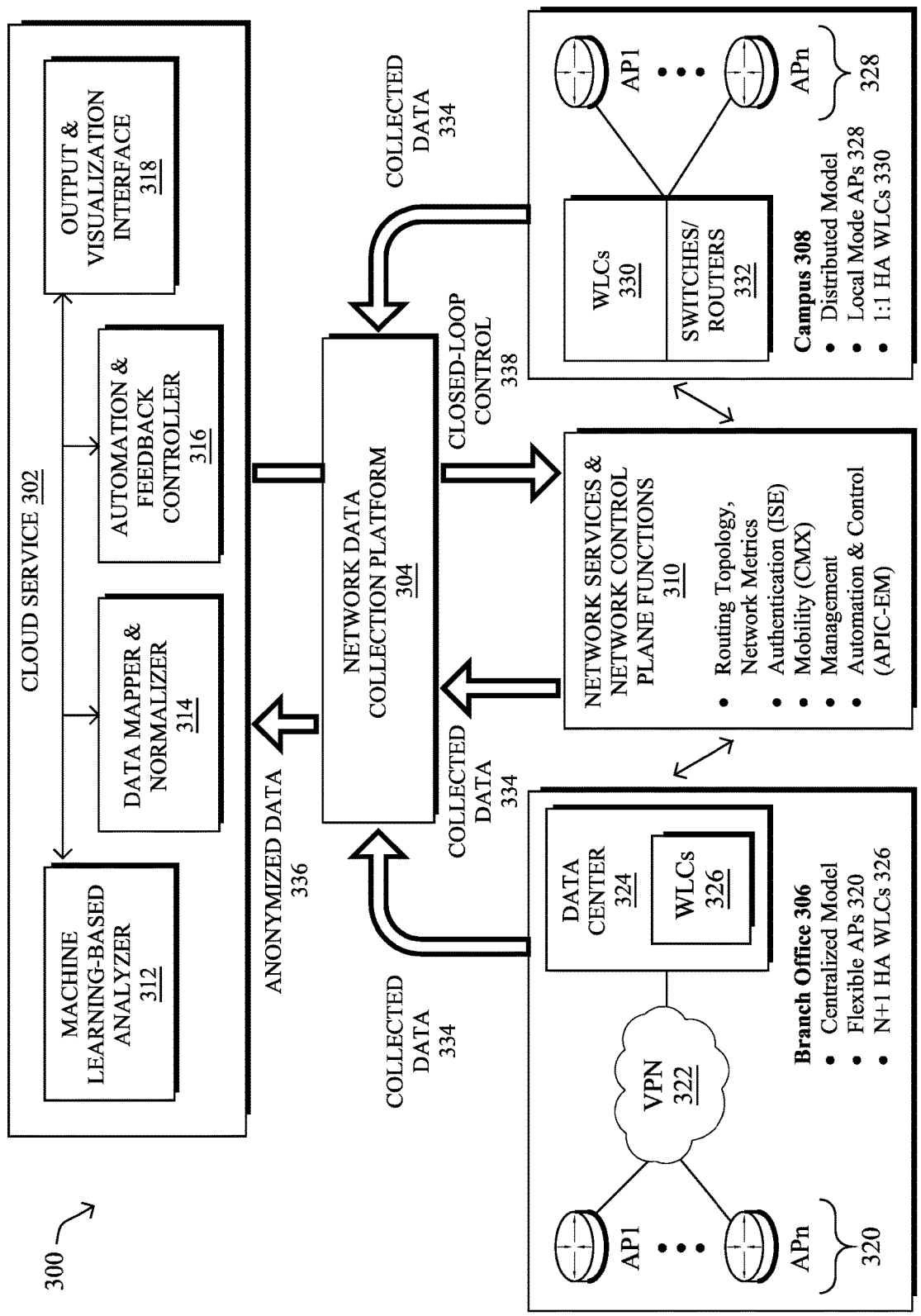
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to is distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the is received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be is configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by is signaling an endpoint to use a particular AP 320 or 328, etc.).

As noted above, networks are inherent complex distributed systems where multiple network devices and protocols interact with each other. Trouble-shooting network problems is often laborious and impossible, since the administrator has to manually skim through a large volume of network data, and analyze these complex interactions to isolate the main causes for the problem. In many cases, these interactions are underlying and not discernable from the raw data.

Using the above techniques, a network assurance system may utilize machine learning to analyze the network data (e.g., JSON files from controllers, NetFlow or IPFIX data, etc.), and provide cognitive insights to the network administrator that aid to troubleshoot complex network problems such as low-throughput or high-packet error events. This may be done using a two-fold approach to deliver cognitive insights: (1) extract the main patterns that cause network problems, and (2) communicate the patterns to the network administrator in a simple and interpretable manner so that the administrator can act on the insights. However, performing these two steps jointly is inherently challenging, as the system must identify complex patterns associated with network problems that are also meaningful to a network administrator.

Deriving Highly Interpretable Cognitive Patterns for Network Assurance

The techniques herein provide for a machine learning system and methods that can identify interpretable cognitive insights for troubleshooting network problems. In some aspects, this can be achieved by automatically identifying the feature boundaries for network problems, tagging them as "symbols" that can be easily understandable by a network administrator. In further aspects, the techniques herein propose the use of interpretable models, such as Association Rule Mining, with the "symbolic features," to derive understandable patterns that cause the network problems, which can then be used to take a mitigation action in the network, so as to avoid the problems. More specifically, the techniques herein introduce an approach to enable machine learning systems to provide interpretable cognitive insights using a three-fold approach: (1) recognize the most important regions of features that are correlated to network problems; (2) tag these is feature regions into discrete categories such as high, medium and low; and (3) use the tagged discrete categories as features for an interpretable model. This approach enables machine learning systems to provide interpretable cognitive insights required for troubleshooting network problems.

Specifically, according to one or more embodiments of the disclosure as described in detail below, a network assurance system that monitors a network labels time periods with positive labels, based on the network assurance system detecting problems in the network during the time periods. The network assurance system assigns tags to discrete portions of a feature space of measurements from the monitored network, based on whether a particular range of values in the feature space has a threshold probability of occurring during a positively-labeled time period. The network assurance system determines a set of the assigned tags that frequently co-occur with the positively-labeled time periods in which problems are detected in the network. The network assurance system causes performance of a mitigation action in the network based on the set of assigned tags that frequently co-occur with the positively-labeled time periods.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
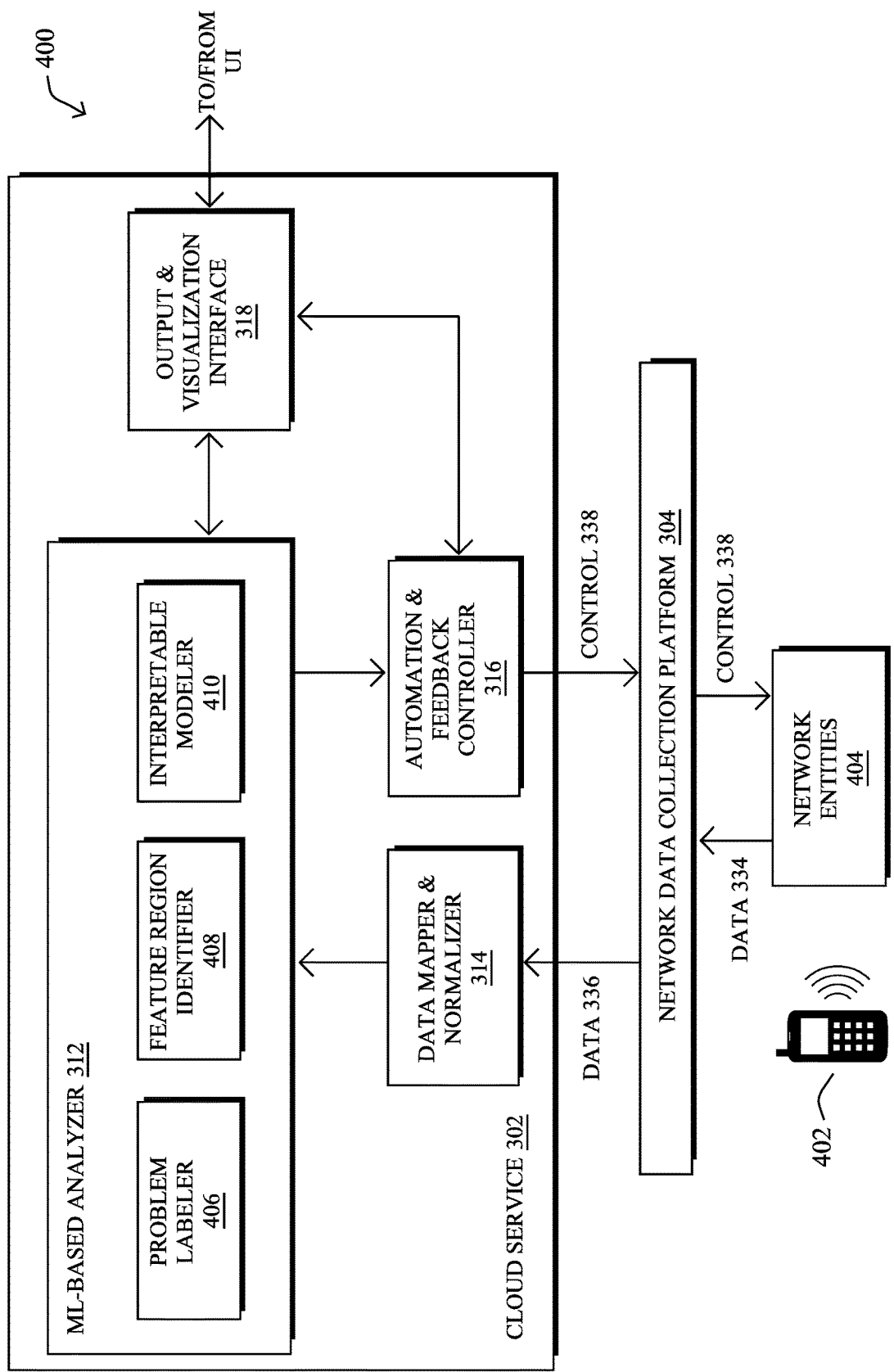
FIG. 4 illustrates an example architecture for deriving cognitive patterns in a network assurance system.

Operationally, FIG. 4 illustrates an example architecture 400 for analyzing common traits in a network assurance system, according to various embodiments. At the core of architecture 400 may be the following components: a problem labeler 406, a feature region identifier 408, and an interpretable modeler 410. In some implementations, the components of architecture 400 may be implemented within a network assurance system, such as system 300 shown in FIG. 3. Accordingly, the components 406-410 of architecture 400 shown may be implemented as part of cloud service 302 (e.g., as part of machine learning-based analyzer 312), as part of network data collection platform 304, and/or on one or more network elements/entities 404 that is communicate with one or more client devices 402 within the monitored network itself. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

In various embodiments, problem labeler 406 may be configured to assign a label to problems detected in the monitored network. In some aspects, problem labeler 406 may tag network period as "positive" (e.g., the period has a particular network problem) or "negative." For example, problem labeler 406 may tag any one hour time period where the per-client throughput is less than 100 bps as a positive period for detecting low-throughput periods in the Access Point (AP). In further embodiments, problem labeler 406 may employ more sophisticated multi-class labels based on the severity of the detected network problem (e.g., low-throughput, medium-throughput and high-throughput).

Problem labeler 406 can define and detect network problems based on input from a user interface (e.g., user-defined problem definitions) or, in further embodiments, do so automatically based on observed network behavior. In one embodiment, problem labeler 406 may employ a machine learning-based anomaly detection model, to detect network problems automatically from measurements collected from the monitored network. For example, problem labeler 406 may apply anomaly detection to throughput metrics from the monitored network and label time periods of low throughput (e.g., throughput lower than the fifth percentile of throughputs observed in the previous week) with the positive label. In further embodiments, problem labeler 406 may employ more advanced anomaly detection techniques, such as time-series based anomaly detection or k-nearest-neighbors (KNN)-based anomaly detection, to tag the low-throughput periods. As noted, problem labeler 406 may also utilize user-defined problem definitions/rules, to label time periods in which network problems are detected. For example, an expert may set a rule related to a specific variable so as to label a specific network event or condition (e.g. bit error rate is on a fiber>$10^{-10}$, convergence time on link failure>100 ms, etc.).

According to various embodiments, feature region identifier 408 may be responsible for two functions: (1) identify the features that contribute largely to the network problems (positive labels), and (2) identify the ranges of feature/measurement values that cause significant network problems. In most implementations, the first part may be carried out through feature engineering. For example, in the above case of a low-throughput network problem, the features/measurements that can affect throughput may be defined as the frequency/channel of the radio, the number of clients connected to the AP, interference on the channel, the received signal strength indicator (RSSI) of the clients, or the like. Hence, for each period of time (1 hour), which was labeled by problem labeler 406, feature region identifier 408 may aggregate these features/measurements as part of a feature space.

Feature region identifier 408 may identify the ranges of values in the feature space that cause network problems in any number of ways. In one embodiment, feature region identifier 408 may apply a machine learning-based classifier to the feature space, to identify the ranges of values where the throughput is low. In a further embodiment, feature region identifier 408 may examine the regions of the feature space that are more prone to network problems. In turn, feature region identifier 408 can find the "feature boundaries" in the feature space. That is to say that feature region identifier 408 can identify the thresholds of feature values at which there is a high probability of positive events (e.g., time periods that have been positively labeled based on a detected network problem).

Figures 5A, 5B:
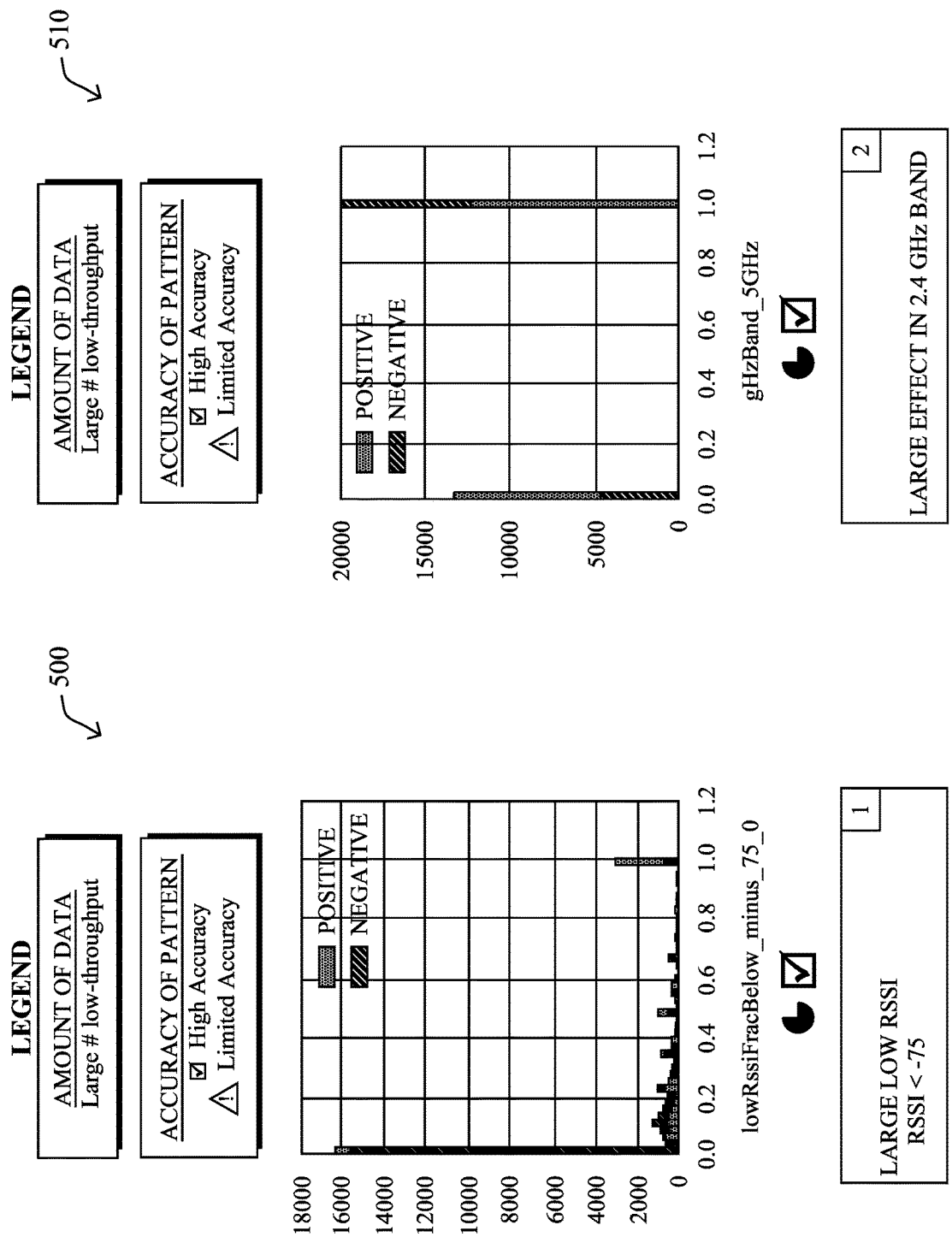
FIGS. 5A-5C illustrate example label distributions for various network measurements.
Figure 5C:
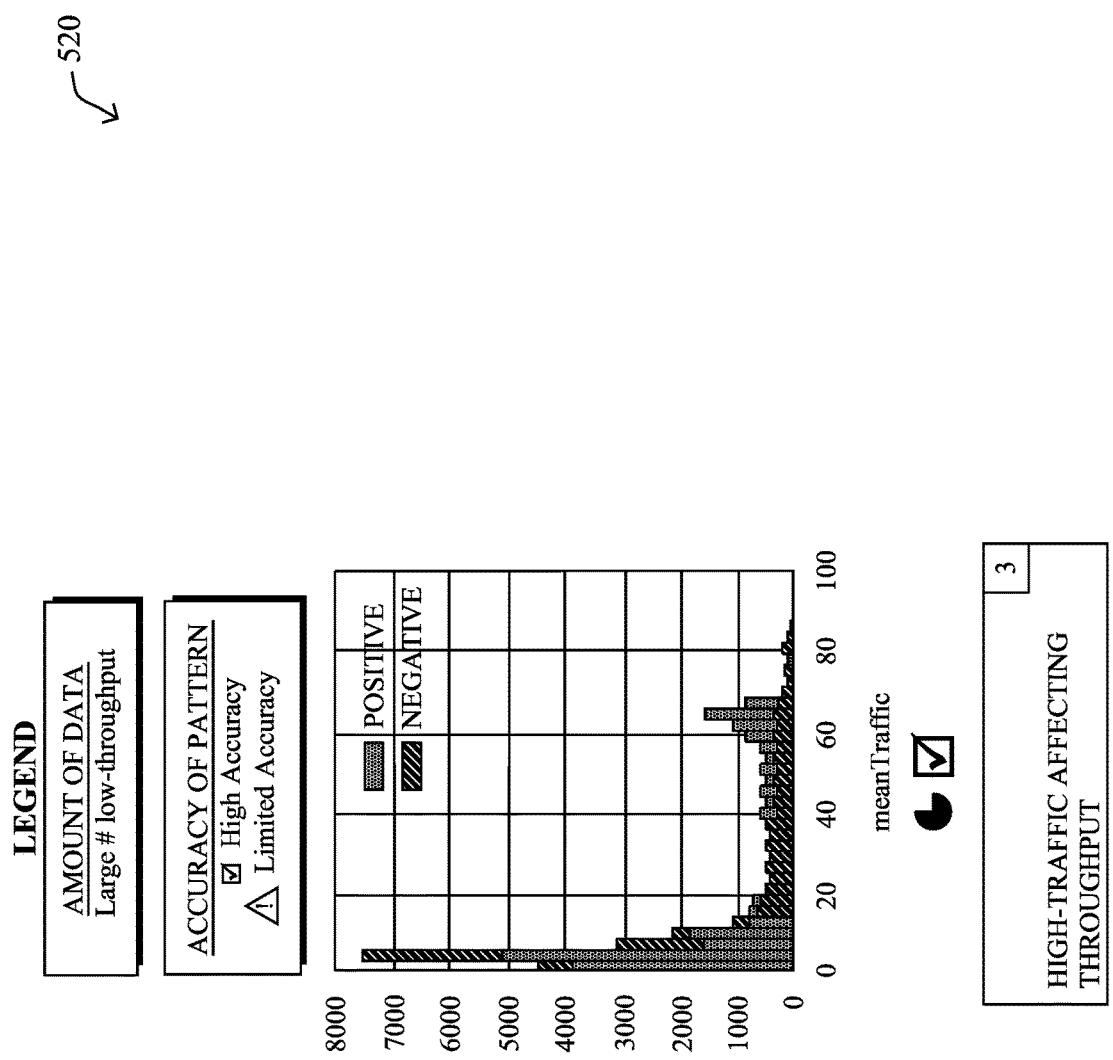

Referring briefly to FIGS. 5A-5C, example label distributions for various network measurements are shown. Notably, plot 500 in FIG. 5A illustrates that when the fraction of low-RSSI packets to total number of received packets is larger than 0.9, then there is a high probability that the positive events (e.g., low-throughput events) ensue. Similarly, as shown by plot 510 in FIG. 5B, low throughput events are also more probably in the 2.4 GHz band, but not the 5 GHz band. In addition, as shown by plot 520 in FIG. 5C, low throughput events are more probable when the mean traffic observed on the air is more is than 60%.

In other words, by assessing the different ranges of measurement values from the monitored network vis-à-vis the detected problems, feature region identifier 408 can identify the thresholds of feature values at which there is a high probability of a positive event occurring.

In further embodiments, feature region identifier 408 in FIG. 4 may execute a machine learning-based decision tree process to identify the most appropriate ranges of feature values that cause the network problem. Note that decision trees may provide very complex rules which can be very difficult for a network administrator to interpret the pattern.

Interpretable modeler 410 may be configured to: (1) engineer features based on the feature boundaries provided by feature region identifier 408, (2) apply a pattern-mining approach identify meaningful patterns in the features, associated with the positive labels, (3) quantify metrics to calibrate the strength of the associations between network patterns, and/or (4) provide output of the strong association rules that emerge as cognitive patterns for network problems.

Interpretable modeler 410 may perform the first step above by discretizing the input features into a set of categorical levels or "tags," based on the feature boundaries obtained from feature region identifier 408. In the example above, if low-throughput events occur when meanTraffic>65%, then interpretable modeler 410 can discretize the features into two levels: "high" and "low" when its value is above or below 65%, the feature boundary. Every feature that has a numerical time-series can be suitably discretized, accordingly. The approach also extends to features that are categorical in nature such as AP group, wireless controller software version (wlcVersion), and the like. Meaningful groupings of wlcVersion into 8.1, 8.2, 8.3, 8.4, etc., can be used as "tags," to capture the state of the network during an issue or failure. Such groupings may also be obtained from feature region identifier 408.

Interpretable modeler 410 may also apply a pattern-mining algorithm to find co-occurrences between the time-series of positive labels (triggered by problem labeler 406) and network tags. In one embodiment, FP Growth can be used to find the most frequently occurring tags associated with positive labels, e.g., in the example above, the tags connected with low throughput events on a radio will be "meanTraffic=High; channelFrequency=2.4 GHz." Such a network pattern is also referred to herein as a "trait." Note, however, there may be more than one network pattern that is associated with an event, especially for the case of a large network with several hundred radios. In that case, there will be several traits that provide possible explanations of the network problem, and it is important to quantify the strength of the association between traits and positive labels.

The third step that interpretable modeler 410 may perform entails calculating metrics that measure the association between a "trait" and "positive labels." There are two types of metrics that can generate insights about the network:

coverage metrics such as the frequency of co-occurrence or the number of radios on which the trait and positive labels co-occur and predictive metrics, such as precision and recall, that measure the "predictive" strength of the trait. Since there can be multiple traits on the network, the metrics provide a way to measure the impact of a trait and rank traits. In turn, interpretable modeler 410 can present the most impactful traits for review by a user, such as via the user interface (UI) in communication with output and visualization interface 318 shown.

The fourth step that interpretable modeler 410 may perform entails the generation of natural language sentences that explain the insight identified in the previous steps. Notably, one mitigation action that interpretable modeler 410 may perform regarding detected network problems is to send a description of the problem for review by a network administrator, along with easily interpretable patterns that may explain the cause of the problem.

Figure 6:
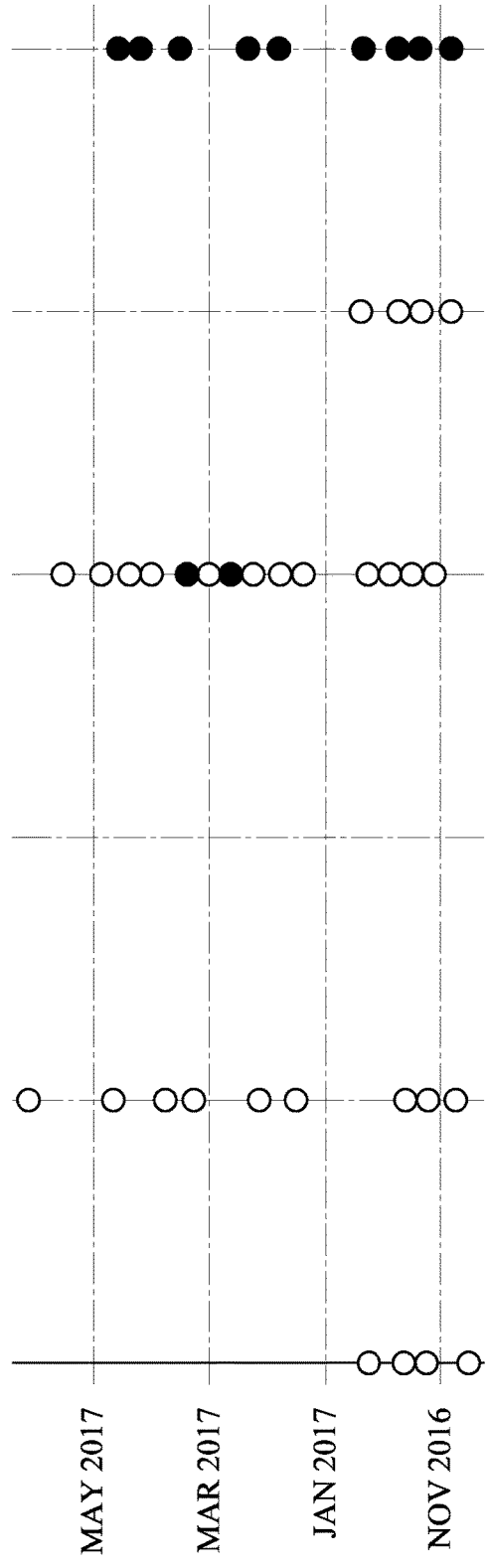
FIG. 6 illustrates an example plot of common traits for network events.

By way of example, FIG. 6 illustrates an example plot of common traits for network events. More specifically, plot 600 illustrates the network patterns associated with radio resent events detected in the monitored network. As shown, the trait is connected with the pattern "high client count as well as high client when RSSI<−70 and RSSI<−75" occurs on four radios over an extended period of time. In addition, the trait that represents the pattern "high meanTraffic and high client count on the UBCV apGroup" occurs on two radios.

Examples of traits and natural language insights, also in the context of radio resets, are demonstrated below. Notably, Tables 1-2 below include contextual information about trait coverage (e.g., where and for how long did the trait and network problem co-occur), as well as some metrics that quantify the strength of the trait as a predictor of the positive labels (e.g., if the trait were to appear again, what would that imply for the network problem?).

TABLE 1

| Trait | # of radios | # of events | Total TP | Lift | Convict. | Precision | Recall | FPR | Loc. Pred. Val. | Global Pred. Value |
|---|---|---|---|---|---|---|---|---|---|---|
| A | 3 | 62 | 37 | 3.19 | 1.99 | 0.011 | 0.6 | 0.21 | 1.46 | 2.12 |
| B | 40 | 749 | 527 | 2.16 | 2.57 | 0.0074 | 0.72 | 0.36 | 1.17 | 1.42 |
| C | 40 | 749 | 529 | 2.16 | 2.58 | 0.0074 | 0.72 | 0.36 | 1.17 | 1.42 |
| D | 5 | 117 | 70 | 1.96 | 1.96 | 0.0109 | 0.61 | 0.32 | 1.24 | 2.1 | whereby traits A-D are as follows:

TABLE 2

| Trait | Tags |
|---|---|
| A | {"apGroup": "UBCV", "channel": "149", "clientCount": "hi", "event": "Radio reset"} |
| B | {"clientCount": "hi", "event": "Radio reset"} |
| C | {"apGroup": "UBCV", {"clientCount": "hi", "event": "Radio reset"} |
| D | {"apGroup": "UBCV", "clientCount": "hi", "event": "R", "location": "default_location"} |

From the above values, interpretable modeler 410 may convert these traits into natural language insights that can be used to notify a network administrator and/or initiate automatic corrections in the monitored network. For example, interpretable modeler 410 may generate the following insights based on the data in Tables 1-2 above:

"3 radios were found to be twice as likely to have radio resets when they experienced high client count on the 5 GHz (channel=149) band in the UBCV apGroup, compared to the rest of the network."

"40 radios are 42% more likely to experience radio resets than other radios in the network when they have high client counts. These radios accounted for 749/1807 (or 40%) of the total radio reset occurrences on the network. More than 70% of these occurrences were related to high client count."

"The same 40 radios were part of the UBCV apGroup. On these radios, high client count was the most likely indicator of a radio reset, corresponding to a 17% increase in radio resets compared to any other consistent factor observed on those radios."

"5 radios, located in the default location, and in the UBCV apGroup, were found to experience a 24% increase in radio resets in the presence of high client count."

Figure 7:
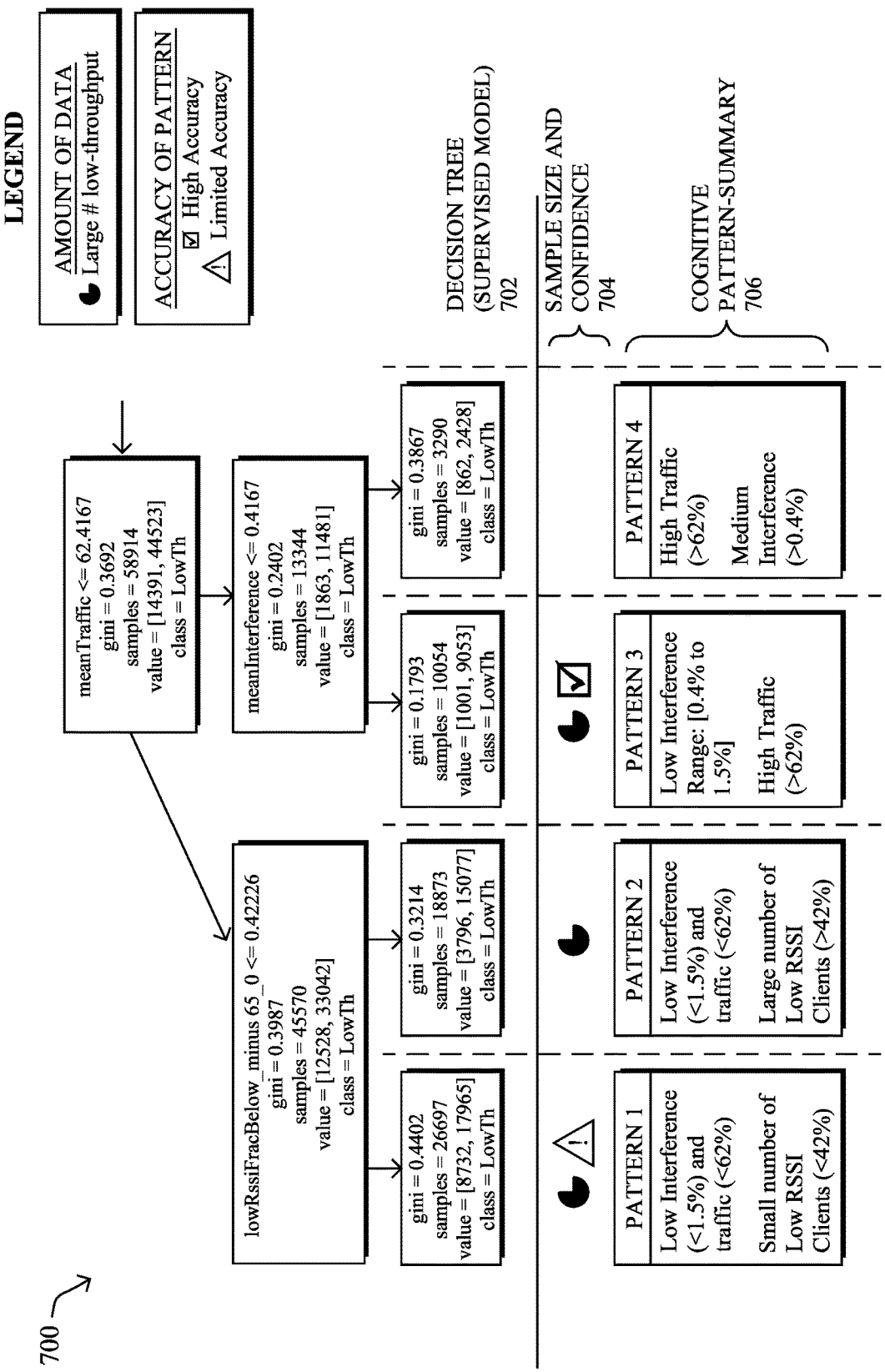
FIG. 7 illustrates an example of deriving cognitive patterns in a network assurance system.

FIG. 7 illustrates an example 700 of deriving cognitive patterns in a network assurance system, according to various embodiments. As shown, the system first uses unsupervised anomaly detection to detect all possible low-throughput scenarios/anomalies in the network. Then, the system generates rules based on these anomalies, while also filtering out those of anomalies that were not deemed relevant by the user (e.g., the cases where less than two clients were associated to an AP). In turn, the system then uses the collected data from the rules to train a supervised learning-based classifier, such as the decision tree 702 shown. Generally, decision tree 702 includes all of the possible and/or relevant features that can affect throughput (e.g., RSSI of clients, interference, packet errors, etc.). The patterns are then inferred by automatically analyzing tree 702, and the patterns are then presented to the user in a language that is easily understandable.

Based on the decision tree 702, various patterns can be extracted from the detected anomalies and presented to the user, to obtain relevancy feedback. As shown, each pattern presented to the user may indicate the sample size and confidence 704. For example, various indicia may be displayed to indicate the amount of data associated with a given pattern, as well as whether the accuracy of the pattern is deemed high accuracy or of limited accuracy. The data presented to the user can also include a cognitive pattern summary 706 that explains the rule components to the user that are associated with the pattern. For example, pattern 1 may indicate that the corresponding anomalies all involve low interference (<1.5%) and traffic (<62%), as well as a small number of low RSSI clients (<42%).

In some cases, the user may provide relevancy feedback regarding the presented patterns. Such feedback 506 may be on a binary scale (e.g., thumbs up or down), on a larger rating scale (e.g., 1-5, 1-10, A-F, etc.). In some cases, the feedback may also include the option to "dig deeper," thereby signifying that the system should explore these conditions through an expanded rule.

The network admin can again indicate a thumbs up/down based on what the pattern interpreted and their expertise. This feedback is taken back to re-label the anomalies. For example, when the network admin chooses Pattern 1 shown (e.g., low throughput anomalies due to only two main factors: low traffic and low interference), the admin may decide that this is, in fact, not a low-throughput anomaly-of-interest since there might be inactive users. This feedback can be used to re-label all low-throughput anomalies with the above condition as not-anomalous. Thus, the system iteratively detects strong anomalies and the anomaly patterns using a mix of supervised and unsupervised approaches.

Figure 8:
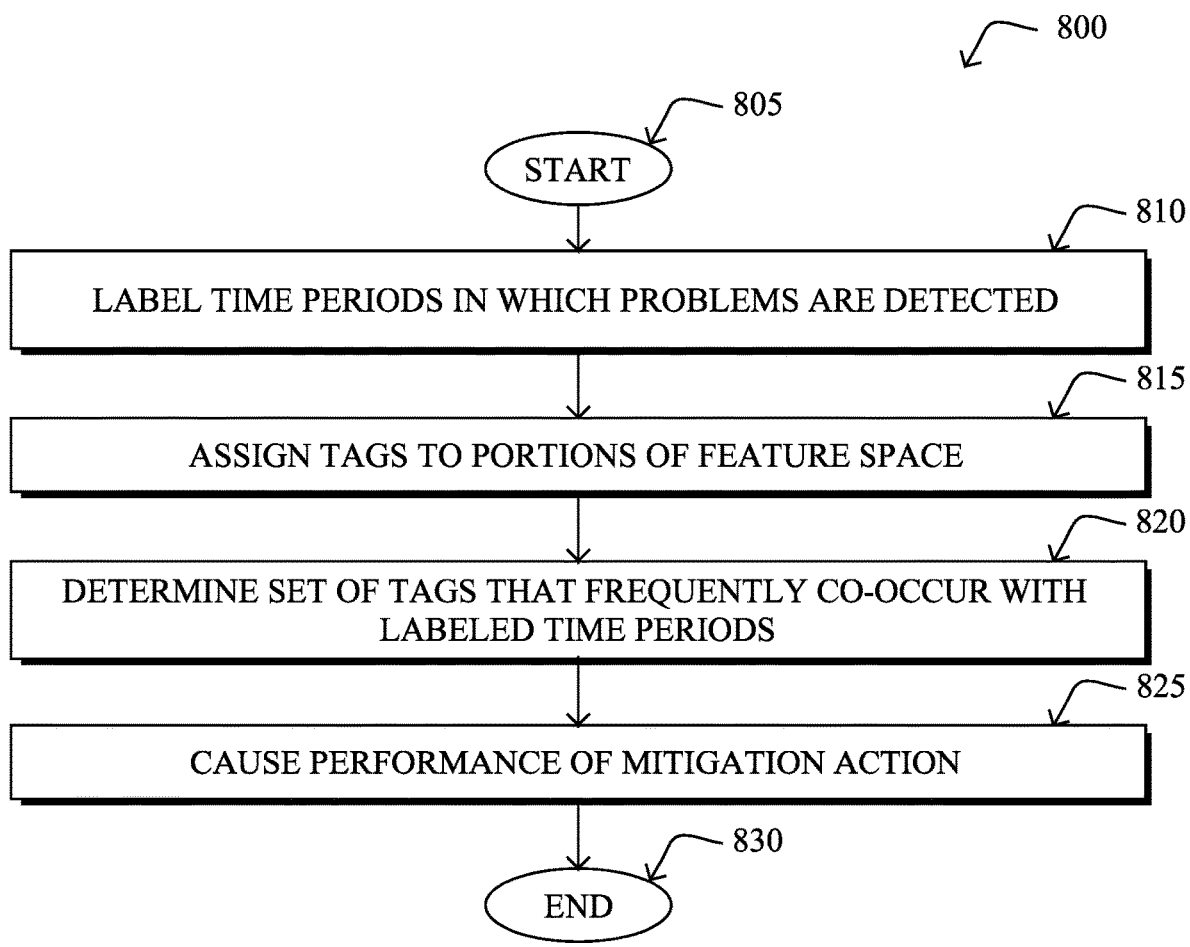
FIG. 8 illustrates an example simplified procedure for deriving cognitive patterns in a network assurance system.

FIG. 8 illustrates an example simplified procedure for deriving cognitive patterns in a network assurance system in a network in accordance with one or more embodiments described herein. For example, a non-generic, specifically configured device (e.g., device 200) may perform procedure 800 by executing stored instructions (e.g., process 248) to implement a network assurance system that monitors one or more networks. The procedure 800 may start at step 805, and continues to step 810, where, as described in greater detail above, the network assurance system may label time periods with positive labels, based on the network assurance system detecting problems in the network during the time periods. In some embodiments, the problem definitions may be user-defined or otherwise preset, such as through the use of static rules (e.g., if packet loss>30%, etc.). In further embodiments, the network assurance system may use machine learning-based anomaly detection, to detect anomalous conditions or behaviors in the monitored network as problematic.

At step 815, as detailed above, the network assurance system may assigns tags to discrete portions of a feature space of measurements from the monitored network, based on whether a particular range of values in the feature space has a threshold probability of occurring during a positively-labeled time period. In some embodiments, the system may do so by applying a machine learning, decision tree-based classifier to the feature space of measurements, to determine an association between the range of values in the feature space and the detected problems. In another embodiment, the network assurance system may apply Frequency Pattern (FP) Growth-based pattern mining to the tags.

At step 820, the network assurance system may determine a set of the assigned tags that frequently co-occur with the positively-labeled time periods in which problems are detected in the network, as described in greater detail above. In some cases, the system may simply perform a count of the number of times a given tag co-occurred with a given type of problem. In further embodiments, the system may also leverage predictive metrics, such as precision and recall, which measure the predictive strength of the trait/tag.

At step 825, as detailed above, the network assurance system may cause the performance of a mitigation action in the network based on the set of assigned tags that frequently co-occur with the positively-labeled time periods. For example, the system may initiate an automatic configuration change in the network, based on the tags. In further embodiments, the system may provide an indication of the assigned tags that frequently co-occur with the positively-labeled time periods as one or more natural language sentences, such as via a user interface. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the identification of often hidden patterns of network measurements that are associated with network events and problems. In some aspects, these patterns can be translated into easily interpretable cognitive patterns, through the identification of feature thresholds and discretization of the feature space.

While there have been shown and described illustrative embodiments that provide for deriving highly interpretable cognitive patterns in a network assurance system, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   labeling, by a network assurance system that monitors a network, time periods with positive labels, each positively-labeled time period being indicative of the network assurance system having detected a problem in the network during the corresponding time period;
   assigning, by the network assurance system, categorical tags to discrete portions of a feature space comprising an aggregation of network measurements from the monitored network, based on whether a particular range of values in the feature space has a threshold probability of occurring during any of the positively-labeled time periods in which problems are detected in the network by applying a machine learning, decision tree-based classifier to the feature space to determine an association between the particular range of values in the feature space and the detected problems;
   determining, by the network assurance system, a set of the assigned categorical tags that frequently co-occur with the positively-labeled time periods in which problems are detected in the network based on one or more predictive strength metrics indicative of a strength of an association between any of the assigned categorical tags and any of the positively-labeled time periods; and
   causing, by the network assurance system, performance of a mitigation action in the network based on the set of assigned categorical tags that frequently co-occur with the positively-labeled time periods.

2. The method as in claim 1, wherein the measurements obtained from the monitored network comprise one or more of: wireless interference, dropped packets, traffic volume, throughput, or an endpoint client count in the network.

3. The method as in claim 1, wherein the mitigation action comprises providing an indication of the assigned tags that frequently co-occur with the positively-labeled time periods as one or more natural language sentences.

4. The method as in claim 1, wherein labeling the time periods with positive labels, based on the network assurance system detecting problems in the network during the time periods comprises:
   applying a machine learning-based anomaly detection model to one or more of the measurements from the monitored network; and
   labeling a given time period with a positive label, when the anomaly detection model determines that the one or more measurements from the monitored network are anomalous.

5. The method as in claim 1, further comprising:
   receiving, at the network assurance system, a definition of a problem condition from a user interface.

6. An apparatus, comprising:
   one or more network interfaces to communicate with a network that comprises a plurality of sensors and actuators;
   a processor coupled to the network interfaces and configured to execute one or more processes; and
   a memory configured to store a process executable by the processor, the process when executed configured to:
      label time periods with positive labels, each positively-labeled time period being indicative of the apparatus having detected a problem in the network during the corresponding time period;
      assign categorical tags to discrete portions of a feature space comprising an aggregation of network measurements from the network, based on whether a particular range of values in the feature space has a threshold probability of occurring during any of the positively-labeled time periods in which problems are detected in the network by applying a machine learning, decision tree-based classifier to the feature space to determine an association between the particular range of values in the feature space and the detected problems;
      determine a set of the assigned categorical tags that frequently co-occur with the positively-labeled time periods in which problems are detected in the network based on one or more predictive strength metrics indicative of a strength of an association between any of the assigned categorical tags and any of the positively-labeled time periods; and
      cause performance of a mitigation action in the network based on the set of assigned categorical tags that frequently co-occur with the positively-labeled time periods.

7. The apparatus as in claim 6, wherein the measurements obtained from the network comprise one or more of: wireless interference, dropped packets, traffic volume, throughput, or an endpoint client count in the network.

8. The apparatus as in claim 6, wherein the mitigation action comprises providing an indication of the assigned tags that frequently co-occur with the positively-labeled time periods as one or more natural language sentences.

9. The apparatus as in claim 6, wherein labeling the time periods with positive labels, based on the apparatus detecting problems in the network during the time periods comprises:
   applying a machine learning-based anomaly detection model to one or more of the measurements from the network; and
   labeling a given time period with a positive label, when the anomaly detection model determines that the one or more measurements from the network are anomalous.

10. The apparatus as in claim 6, wherein the process when executed is further configured to:
receive a definition of a problem condition from a user interface.

11. A tangible, non-transitory, computer-readable medium storing program instructions that cause a network assurance system that monitors a network to execute a process comprising:
labeling, by the network assurance system, time periods with positive labels, each positively-labeled time period being indicative of the network assurance system having detected a problem in the network during the corresponding time period;
assigning, by the network assurance system, categorical tags to discrete portions of a feature space comprising an aggregation of network measurements from the monitored network, based on whether a particular range of values in the feature space has a threshold probability of occurring during any of the positively-labeled time periods in which problems are detected in the network by applying a machine learning, decision tree-based classifier to the feature space to determine an association between the particular range of values in the feature space and the detected problems;
determining, by the network assurance system, a set of the assigned categorical tags that frequently co-occur with the positively-labeled time periods in which problems are detected in the network based on one or more predictive strength metrics indicative of a strength of an association between any of the assigned categorical tags and any of the positively-labeled time periods; and
causing, by the network assurance system, performance of a mitigation action in the network based on the set of assigned categorical tags that frequently co-occur with the positively-labeled time periods.

12. The computer-readable medium as in claim 11, wherein the measurements obtained from the monitored network comprise one or more of: wireless interference, dropped packets, traffic volume, throughput, or an endpoint client count in the network.

13. The computer-readable medium as in claim 11, wherein the mitigation action comprises providing an indication of the assigned tags that frequently co-occur with the positively-labeled time periods as one or more natural language sentences.

14. The computer-readable medium as in claim 11, wherein labeling the time periods with positive labels, based on the network assurance system detecting problems in the network during the time periods comprises:
applying a machine learning-based anomaly detection model to one or more of the measurements from the monitored network; and
labeling a given time period with a positive label, when the anomaly detection model determines that the one or more measurements from the monitored network are anomalous.

* * * * *

UNITED STATES PATENT AND TRADEMARK OFFICE
CERTIFICATE OF CORRECTION

PATENT NO. : 11,049,033 B2
APPLICATION NO. : 15/869639
DATED : June 29, 2021
INVENTOR(S) : Vinay Kumar Kolar et al.

It is certified that error appears in the above-identified patent and that said Letters Patent is hereby corrected as shown below:

In the Specification

Column 1, Line 29, please amend as shown:
referring to the following description in conjunction with Column 1, Line 59, please amend as shown:
of values in the feature space has a threshold probability Column 4, Line 12, please amend as shown:
resentations in a network-based architecture. In particular, Column 4, Line 53, please amend as shown:
months (e.g., seasonal changes of an outdoor environ- Column 5, Line 28, please amend as shown:
Cisco Systems, Inc., another operating system, etc.), Column 6, Line 3, please amend as shown:
the per day peak from the current week AND more than Column 6, Line 45, please amend as shown:
semi-supervised machine learning models. Generally, Column 7, Line 22, please amend as shown:
ratio of true positives the sum of true and false positives.

Column 7, Line 46, please amend as shown:
AP1 through nth access point, $AP_n$ through which endpoint Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,049,033 B2

Column 7, Line 64, please amend as shown:
328 may instead be connected to distributed WLCs 330

Column 8, Line 38, please amend as shown:
map and normalize the received data into a unified data Column 9, Line 12, please amend as shown:
analyzer 312 may be configured to build predictive Column 10, Line 32, please amend as shown:
operations (e.g., by signaling an endpoint to use a par- Column 11, Line 8, please amend as shown:
lems; (2) tag these feature regions into discrete categories Column 11, Line 50, please amend as shown:
one or more network elements/entities 404 that commu- Column 12, Line 25, please amend as shown:
on a fiber>$10^{-10}$, convergence time on link failure>100

Column 12, Line 67, please amend as shown:
traffic observed on the air is more than 60%.

Column 14, Line 23, please amend as shown:
the trait connected with the pattern "high client count as Column 17, Line 17, please amend as shown:
advantages. For instance, it is expressly contemplated that